(12) United States Patent
Ren

(10) Patent No.: US 9,173,210 B2
(45) Date of Patent: Oct. 27, 2015

(54) METHOD FOR UPLINK TRANSMISSION OF RADIO LINK CONTROL LAYER AND EVOLVED NODE B

(75) Inventor: Wei Ren, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 92 days.

(21) Appl. No.: 13/820,361

(22) PCT Filed: May 16, 2011

(86) PCT No.: PCT/CN2011/074110
§ 371 (c)(1),
(2), (4) Date: Mar. 1, 2013

(87) PCT Pub. No.: WO2012/027997
PCT Pub. Date: Mar. 8, 2012

(65) Prior Publication Data
US 2013/0170461 A1    Jul. 4, 2013

(30) Foreign Application Priority Data
Sep. 2, 2010 (CN) .......................... 2010 1 0271846

(51) Int. Cl.
*H04W 72/04* (2009.01)
*H04L 1/18* (2006.01)
(Continued)

(52) U.S. Cl.
CPC ......... *H04W 72/0413* (2013.01); *H04L 1/1893* (2013.01); *H04L 1/1896* (2013.01); *H04W 28/04* (2013.01); *H04W 72/042* (2013.01); *H04W 72/1284* (2013.01)

(58) Field of Classification Search
CPC ................................................ H04W 72/0413

USPC .................. 370/329, 338, 341, 348; 455/450
See application file for complete search history.

(56) References Cited

U.S. PATENT DOCUMENTS

2005/0047416 A1    3/2005  Heo et al.
2006/0223543 A1*  10/2006  Usuda et al. .................. 455/450
(Continued)

FOREIGN PATENT DOCUMENTS

| CN | 1870591 A | 11/2006 |
|---|---|---|
| CN | 1992679 A | 7/2007 |
| WO | WO-2009/100150 A1 | 8/2009 |

OTHER PUBLICATIONS

International Search Report for International Application No. PCT/CN2011/074110, mailed Aug. 25, 2011 (3 pages).
(Continued)

*Primary Examiner* — Brian D Nguyen
*Assistant Examiner* — Toan Nguyen
(74) *Attorney, Agent, or Firm* — Clark & Elbing LLP

(57) ABSTRACT

A method for RLC layer uplink transmission and an ENB are provided. The method comprises: step A, after a terminal initiated RLC layer transmission of service or uplink signaling in uplink acknowledged mode, the ENB stores identifier of the terminal and information of RLC layer segment. The information of the RLC layer segment comprises size of the RLC layer segment. Step B, the ENB detects scheduling request message sent by terminal, and when the terminal determined that the ENB does not correctly receive the uplink signaling or the service initiated by terminal, the scheduling request message is configured to trigger an RLC layer retransmission of the uplink signaling or the service. Step C, according to size of the RLC layer segment stored, the ENB performs uplink authorization to the terminal, determines radio resource to be allocated for the terminal, and transmits information of the allocated radio resource to the terminal.

15 Claims, 3 Drawing Sheets

(51) Int. Cl.
*H04W 28/04* (2009.01)
*H04W 72/12* (2009.01)

(56) References Cited

U.S. PATENT DOCUMENTS

| | | | |
|---|---|---|---|
| 2008/0259862 A1* | 10/2008 | Yeo et al. | 370/329 |
| 2009/0149189 A1* | 6/2009 | Sammour et al. | 455/450 |
| 2009/0196275 A1 | 8/2009 | Damnjanovic et al. | |
| 2009/0239545 A1* | 9/2009 | Lee et al. | 455/450 |
| 2009/0323605 A1* | 12/2009 | Umesh et al. | 370/329 |
| 2010/0157915 A1* | 6/2010 | Tsai | 370/329 |
| 2010/0177730 A1* | 7/2010 | Okuda | 370/329 |
| 2010/0322156 A1* | 12/2010 | Wu | 370/329 |

OTHER PUBLICATIONS

International Preliminary Report on Patentability for International Application No. PCT/CN2011/074110, issued Mar. 5, 2013 (5 pages).

Written Opinion of the International Searching Authority for International Application No. PCT/CN2011/074110, mailed Aug. 25, 2011 (4 pages).

* cited by examiner

METHOD FOR UPLINK TRANSMISSION OF RADIO LINK CONTROL LAYER AND EVOLVED NODE B

CROSS-REFERENCE TO RELATED APPLICATIONS

This application is the U.S. National Stage filing under 35 U.S.C. §371 of International Application No. PCT/CN2011/074110, filed May 16, 2011, which claims the benefit of Chinese Patent Application No. 201010271846.0, filed Sep. 2, 2010.

FIELD OF THE INVENTION

The present invention relates to the communication field, and more particularly to a method for uplink transmission of the radio link control (RLC) layer in the long term evolution (LTE) mobile communication system and an Evolved Node B (ENB, eNodeB).

BACKGROUND OF THE INVENTION

FIG. 1 is the radio network model of the LTE network communication system in the related art. As shown in FIG. 1, the system mainly comprises a user equipment (UE), an ENB and an Evolved Packet Core (EPC) network. The terminal is the user's operating terminal which can access the network to receive the uplink and downlink transmission services provided by the network and can respond to the network side signaling.

In the radio communication system, the RLC layer of the user plane can be used to provide users with the transmission of the signaling and the service in the acknowledged mode. When the condition of uplink radio channel is poor or an error occurs in the interior reception of RLC packet in the ENB, the retransmission of the RLC peer layer between the ENB and the UE can be triggered, thus ensuring the reliable transmission of the signaling and the service to the greatest extent. However, the reliability is ensured at the cost of transmission time. Thus actually, the delay of the user plane and the control plane is significantly increased.

FIG. 2 is a flow diagram of the method for uplink transmission of uplink RLC in the related art. As shown in FIG. 2, the method for uplink transmission of uplink RLC in the related art comprises the following steps.

Step 201, a UE initiates the RLC layer transmission of a signaling or a service in uplink Acknowledged Mode (AM) to an ENB.

Step 202, the ENB does not receive the RLC packet (the RLC layer segment) of the above transmission, and sends a response of unsuccessful reception (response of NACK).

Step 203, the UE sends a Scheduling Request (SR) signaling to trigger an RLC layer retransmission.

Step 204, the ENB distributes one scheduling by sending a DCI0 signaling and allocates a minor uplink authorization to the base station. The size of the authorization is the number of bits used by the Buffer State Report (BSR) value.

Step 205, the UE reports the BSR value through the Physical uplink shared channel (PUSCH).

Step 206, the ENB performs an uplink scheduling according to the size of BSR, and distributes a DCI0 signaling for indicating the radio resource allocation information again.

Step 207, the UE performs the RLC layer retransmission. Exemplarily, the UE performs the RLC layer retransmission of the user signaling or the AM service through PUSCH.

The inventors of the present invention have the following findings about the above mentioned related art. As shown in FIG. 2, during the RLC layer transmission of the user signaling or the AM service, after receiving a signaling indicating that the ENB did not normally receive the uplink data of the user (the signaling of RLC NACK), the RLC layer retransmission is needed to be performed. During the RLC layer retransmission, the user is required to re-report the BSR, and the ENB is required to distribute an extra DCI0 signaling for indicating the radio resource allocation information so as to find out the buffer state of the user. The disadvantage of the related RLC layer retransmission solution lies in that the delay of the service in the user plane and the signaling in the control plane is increased, which affects the satisfaction degree of the user.

Therefore, how to optimize the related RLC layer retransmission and to decrease the delay of the user plane and the control plane so as to increase the satisfaction degree of the user becomes an importance subject in the LTE system.

SUMMARY OF THE INVENTION

The present invention provides a method for uplink transmission of radio link control layer and an ENB. The solution of the present invention can solve the technical problem of the increased delay of the service in the user plane and the signaling in the control plane during the RLC uplink retransmission in the related art.

The present invention provides a method for uplink transmission of radio link control layer, comprising the following steps:

step A, after a terminal initiates RLC layer transmission of an uplink signaling or a service in an uplink acknowledged mode, an Evolved Node B (ENB) storing an identifier of the terminal and information of a RLC layer segment of the RLC layer transmission, wherein the information of the RLC layer segment comprises a size of the RLC layer segment;

step B, the ENB detecting a scheduling request message sent by the terminal, wherein the scheduling request message is sent when the terminal determines that the ENB does not correctly receive the uplink signaling or the service initiated by the terminal, and the scheduling request message is configured to trigger RLC layer retransmission of the uplink signaling or the service; and step C, according to the stored size of the RLC layer segment, the ENB performing uplink authorization to the terminal, determining radio resource to be allocated for the terminal, and transmitting information of the allocated radio resource to the terminal.

Preferably, in the method, the step A comprises:

step A1, a user plane entity of the ENB storing the identifier of the terminal and the information of the RLC layer segment of the transmission initiated by the terminal, and sending the identifier of the terminal and information of the size of the RLC layer segment to an uplink scheduler of the ENB; and in the step C, according to the stored size of the RLC layer segment, the uplink scheduler of the ENB performs the uplink authorization to the terminal, and determines the radio resource to be allocated for the terminal.

Preferably, in the method, the information of the RLC layer segment of the transmission further comprises: a combining result of the segment; and the step A1 comprises:

the user plane entity of the ENB sending the identifier of the terminal and the information of the size of the RLC layer segment of which the combining result is unsuccessful to the uplink scheduler of the ENB.

Preferably, in the method, in the step C, when performing the uplink authorization, the ENB determines the radio resource to be allocated for the terminal to be: greater or equal to the stored size of the RLC layer segment.

Preferably, in the method, in the step C, when performing the uplink authorization, the ENB determines the radio resource to be allocated for the terminal to be equal to: a sum of the stored size of the RLC layer segment and a size of a Buffer State Report (BSR) Media Access Control (MAC) control element.

On the other hand, an ENB is provided, comprising a user plane entity and an uplink scheduler, wherein the user plane entity comprises:

a storing module, configured to, after a terminal initiates Radio Link Control (RLC) layer transmission of an uplink signaling or a service in an uplink acknowledged mode, store an identifier of the terminal and information of a RLC layer segment of the RLC layer transmission, wherein the information of the RLC layer segment comprises a size of the RLC layer segment;

a detecting module, configured to detect a scheduling request message sent by the terminal, wherein the scheduling request message is sent when the terminal determines that the ENB does not correctly receive the uplink signaling or the service initiated by the terminal, and the scheduling request message is configured to trigger RLC layer retransmission of the uplink signaling or the service; and a sending module, configured to, when the detecting module detects the scheduling request message configured to initiate retransmission, send the identifier of the terminal and the information of the size of the RLC layer segment stored by the storing module to the uplink scheduler; and the uplink scheduler is configured to perform uplink authorization to the terminal, determine radio resource to be allocated for the terminal and transmit information of the allocated radio resource to the terminal, according to the identifier of the terminal and the size of the RLC layer segment sent by the sending module.

Preferably, for the ENB, the information of the RLC layer segment of the transmission further comprises: a combining result of the segment; and the sending module is further configured to send the identifier of the terminal and the information of the size of the RLC layer segment of which the combining result is unsuccessful to the uplink scheduler of the ENB.

Preferably, for the ENB, the uplink scheduler comprises:

a radio resource determining module, configured to determine the radio resource to be allocated for the terminal to be greater or equal to the stored size of the RLC layer segment.

Preferably, for the ENB, the radio resource determining module is further configured to determine the radio resource to be allocated for the terminal to be equal to: a sum of the stored size of the RLC layer segment and a size of a Buffer State Report (BSR) Media Access Control (MAC) control element.

The present invention has the following technical effects.

In the present invention, when the terminal applies for the uplink resource due to RLC layer retransmission, the ENB performs the uplink authorization to the terminal directly according to the retransmission information of the RLC layer of the user plane stored in the ENB, such as the size of the RLC layer segment information to be retransmitted (namely, the size of the retransmission packet). In this way, the terminal does not have to report the BSR for retransmission. And, the ENB does not have to perform a downlink scheduling. Thus, this solution decreases the delay of the RLC layer retransmission on the user plane and the control plane and realizes the optimization of the RLC layer retransmission.

DETAILED DESCRIPTION OF THE EMBODIMENTS

To clearly illustrate the objective, technical solution and advantage of the present invention, the present invention is described in detail hereinafter in conjunction with the drawings and the embodiments.

Figure 1:
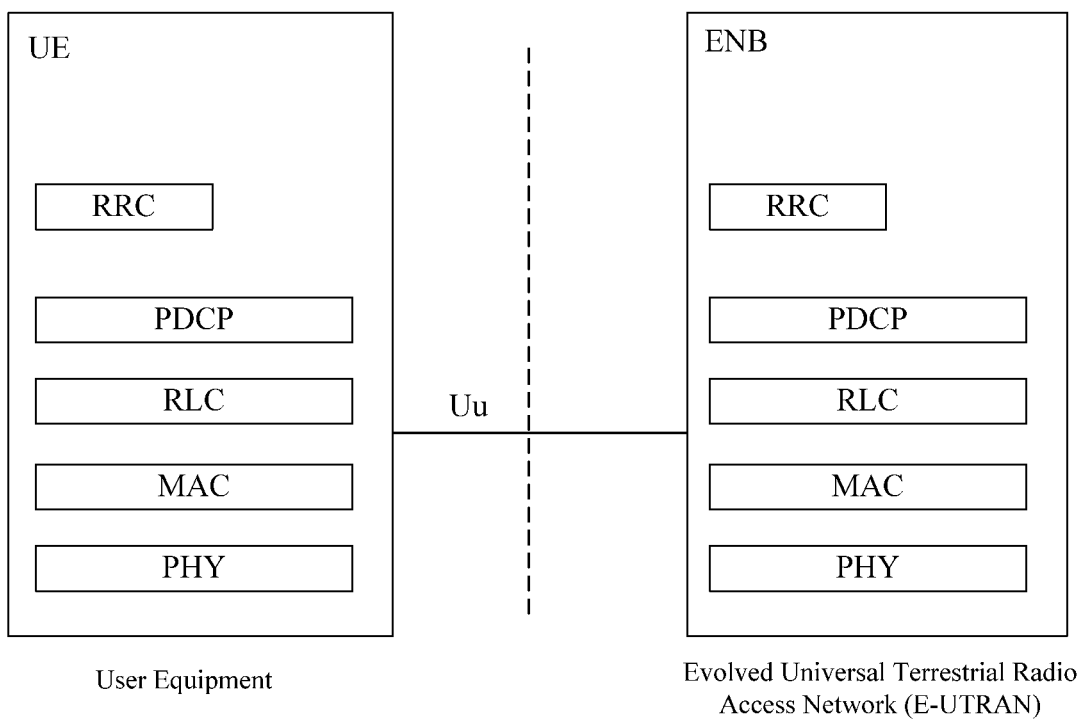
FIG. 1 is a schematic diagram of the radio network model of the LTE network communication system in the related art.
Figure 2:
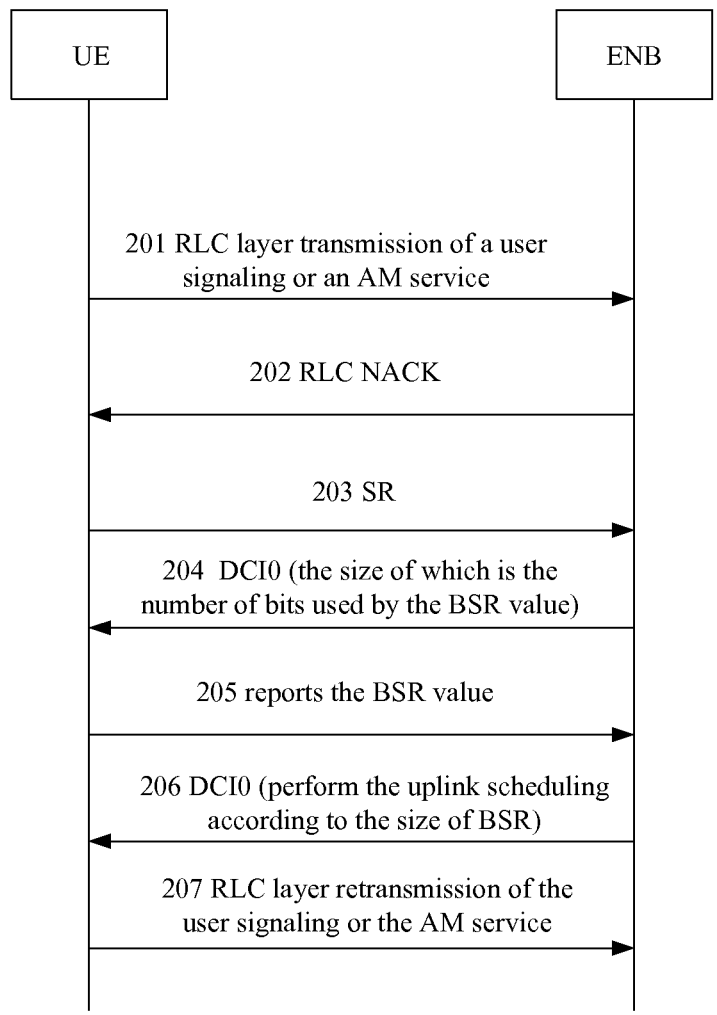
FIG. 2 is a flow diagram of the method of uplink transmission of uplink RLC in the related art.
Figure 3:
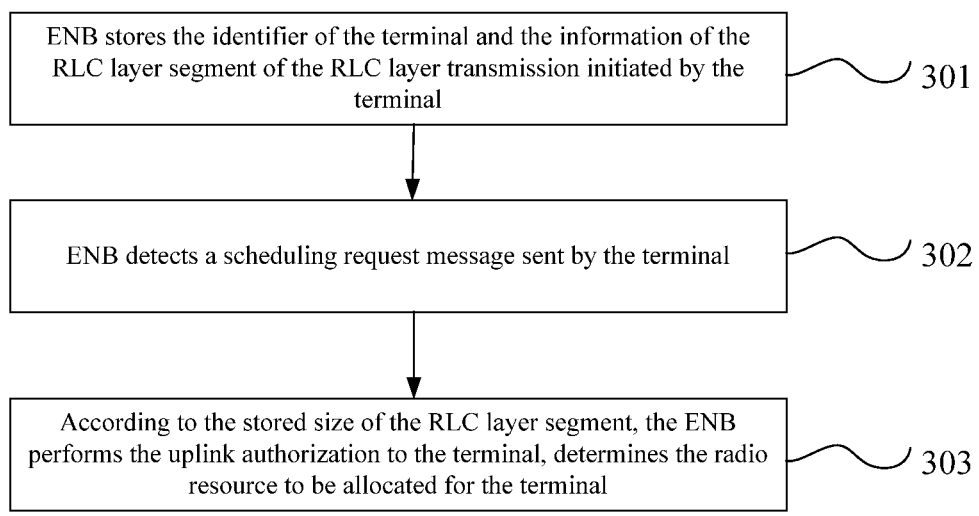
FIG. 3 is a flow diagram of the method for uplink transmission of RLC layer according to the embodiment of the present invention.

FIG. 3 is a flow diagram of the method for uplink transmission of RLC layer according to the embodiment of the present invention. As shown in FIG. 3, the method of uplink transmission of RLC according to the present invention comprises the following steps.

Step 301, after a terminal initiated RLC layer transmission of a service or an uplink signaling in uplink acknowledged mode, the ENB stores the identifier of the terminal and the information of the RLC layer segment of the RLC layer transmission, wherein the information of the RLC layer segment comprises the size of the RLC layer segment.

Step 302, the ENB detects a scheduling request message sent by the terminal, wherein the scheduling request message is sent when the terminal determined that the ENB does not correctly receive the uplink signaling or the service initiated by the terminal, and the scheduling request message is configured to trigger the RLC layer retransmission of the uplink signaling or the service.

Step 303, according to the stored size of the RLC layer segment, the ENB performs the uplink authorization to the terminal, determines the radio resource to be allocated for the terminal, and transmits the information of the allocated radio resource to the terminal.

In the above, the size of the RLC layer segment is a bit size, namely the number of the bits contained in the RLC layer segment.

In the method according to the embodiment of the present invention, during the RLC uplink retransmission, the ENB performs an uplink authorization directly to the terminal initiating the retransmission, according to the stored size of the RLC layer segment. The above-mentioned stored information of the RLC layer segment comprises the size of the segment. The information of the RLC layer segment is obtained by the ENB after the terminal initiated the transmission of an uplink signaling or a service in uplink acknowledged mode for the first time. Exemplarily, the information of the RLC layer segment is obtained by the ENB according to the packet header of the data packet transmitted.

Preferably, the stored information of the RLC layer segment, comprising the size of the RLC layer segment, is stored at the user plane entity of the ENB. When the uplink authorization is performed, the user plane entity transmits to the uplink scheduler of the ENB the corresponding information of the RLC layer to be retransmitted, comprising the identifier of the terminal and the size of the RLC layer segment to be retransmitted (namely the size of the retransmission packet). The uplink scheduler of the ENB determines the resource to be allocated for the terminal according to the size of the RLC layer segment. In the present invention, the size of the RLC layer segment to be retransmitted, namely the size of the RLC layer retransmission packet, is imparted to the uplink scheduler of the ENB inside the ENB via the user plane without wasting the time and resource of air interface signaling.

Preferably, in the method according to the embodiment of the present invention, step 301 comprises:

Step 3011, the user plane entity of the ENB stores the identifier of the terminal and the information of the RLC layer segment of the transmission initiated by the terminal, and sends the identifier of the terminal and the information of the size of the RLC layer segment to the uplink scheduler of the ENB.

In step 303, according to the stored size of the RLC layer segment, the uplink scheduler of the ENB performs an uplink authorization to the terminal and determines the radio resource to be allocated for the terminal.

Preferably, in the method according to the embodiment of the present invention, the information of the RLC layer segment of the transmission further comprises: the combining result of the segment; and step 3011 comprises that:

the user plane entity of the ENB sends the identifier of the terminal and the information of the size of the RLC layer segment of which the combining result is unsuccessful to the uplink scheduler of the ENB.

Exemplarily, the combining result of the segment comprises: successful (ACK) and unsuccessful (NACK). When the user plane entity transmits to the uplink scheduler the information of the RLC layer segment to be retransmitted, such as the information of the size of the RLC layer segment, it is possible to only transmit the information of the RLC layer segment of which the combining is unsuccessful.

Preferably, for the method according to the embodiment of the present invention, in step 303, when the ENB performs an uplink authorization, the radio resource to be allocated for the terminal is determined to be: greater or equal to the stored size of the RLC layer segment.

Preferably, for the method according to the embodiment of the present invention, in step 303, when the ENB performs an uplink authorization, the radio resource to be allocated for the terminal is determined to be: the sum of the stored size of the RLC layer segment and the size of the Buffer State Report Media Access Control layer Control Element (BSR MAC CE). In this way, the BSR and the RLC layer segment which needs to be retransmitted can be scheduled in one time of uplink scheduling, if possible. This solution can overcome the disadvantage that when the size of RLC layer retransmission segment is unknown, if the size of the uplink scheduling is too small, it can lead to the re-segmentation of the RLC layer retransmission segment, which causes increased transmission delay. The size of BSR MAC CE is the bit size, namely the number of the bits occupied by BSR MAC CE. Exemplarily, the size of the BSR MAC CE does not exceed 4 bytes.

Figure 4:
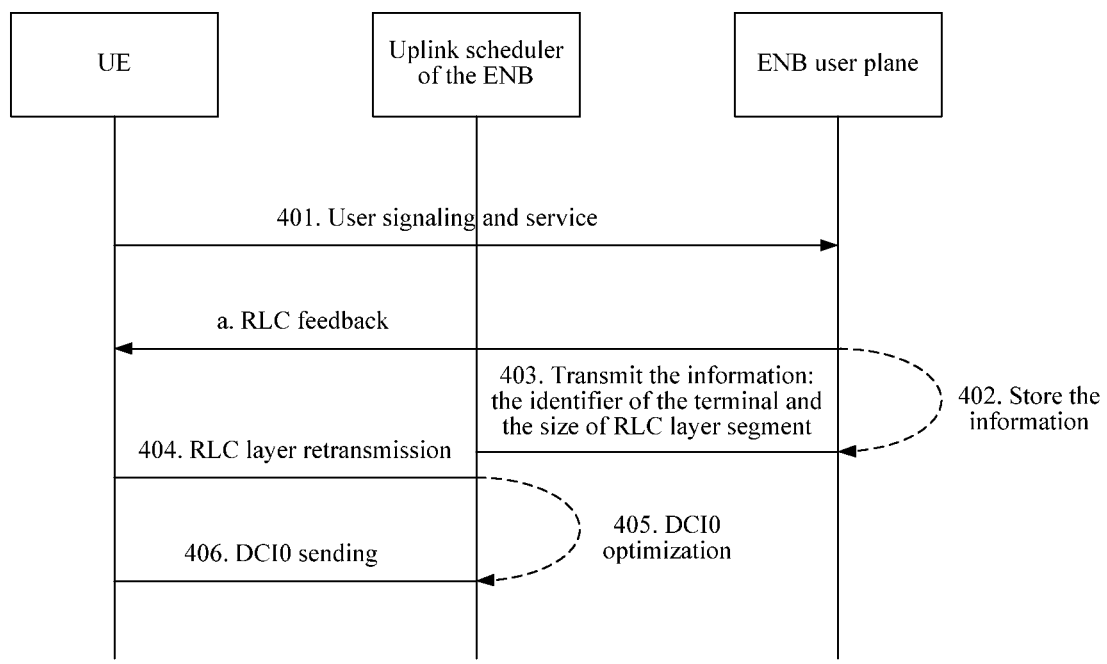
FIG. 4 is a flow diagram of the method for uplink transmission of RLC layer according to the embodiment of the present invention.

FIG. 4 is a flow diagram of the method for uplink transmission of RLC layer according to the embodiment of the present invention. As shown in FIG. 4, the method according to the embodiment comprises the following steps.

Step 401, the UE initiates the RLC layer transmission of the service in uplink acknowledged mode.

Step 402, the user plane in the ENB stores the identifier and the information of the RLC layer segment of the UE, comprising: the Serial Number (SN) of the RLC layer, the size of the segment (unit: bits) and the combining result of the RLC layer segment. The combining result is ACK or NACK. ACK represents that the combining is successful and the ENB successfully receives the service and signaling transmitted by the terminal. NACK represents that the combining is unsuccessful and the ENB fails to receive the service and signaling transmitted by the terminal, so that the terminal has to retransmit the service or signaling. Exemplarily, the terminal can be identified with the Radio Network Temporary Identifier (RNTI).

Step 403, by communication inside the ENB, the RLC information of which the combining result is NACK is transmitted to the uplink scheduler of the ENB, wherein the RLC information comprises the identifier of the terminal, such as the RNTI information of the terminal, the size of the RLC layer segment to be retransmitted, etc.

Step 404, the UE triggers the RLC layer retransmission. When there is no uplink authorization, a Scheduling Request (SR) is sent to apply for an uplink authorization.

Step 405, the ENB detects the SR of the user configured to trigger a retransmission, optimizes uplink authorization (DCI0) and determines the size of the radio resource to be allocated, such as the size of Tbsize, to be equal to the sum of the size of BSR MAC CE and the size of the RLC layer retransmission segment.

Step 406, according to the determined allocation information of the radio resource, the ENB sends the information for indicating radio resource allocation to the UE. Exemplarily, the ENB sends DCI0, namely the downlink control information format 0.

Subsequently, the UE uses the allocated radio resource to perform the retransmission of the RLC layer segment.

As shown in FIG. 4, the method according to the embodiment can further comprise: step a, the RLC of the ENB feeds back to the UE the response whether the reception is successful. When a retransmission is required, the response is NACK, that is, it is unsuccessful. The response is transmitted via an air interface. After receiving a response message that it is unsuccessful, the UE sends a SR to trigger a retransmission. When detecting the SR configured to trigger the retransmission, the ENB performs an uplink authorization. This step comes after step 401 and before step 404.

Further, the method of uplink transmission of RLC layer according to the embodiment of the present invention can be used for the transmission of uplink signaling, which is described below by an example. Exemplarily, the method can be used for the uplink signaling transmission of UE capability information performed by the UE to report the UE's capability. When the terminal randomly accesses the ENB, the UE side performs the uplink signaling transmission of the UE capability information. The user plane in the ENB stores the identifier of the UE and the information of the transmitted RLC layer segment. The information mainly comprises the SN of the RLC layer, the size of the segment and the combining result of the RLC layer segment (ACK or NACK). By communication inside the ENB, the information of the RLC layer segment of which the combining result is NACK, comprising the RNTI, the size of the segment and other parameters, is transferred to the uplink scheduler of the ENB. The UE triggers the retransmission of the RLC, and sends a SR to apply for an uplink authorization when there is no uplink authorization. The ENB detects the SR of the UE, optimizes the uplink authorization (DCI0) and determines the size of the radio resource to be allocated, such as Tbsize, to be the sum of the bit size of BSR MAC CE and the bit size of the RLC layer retransmission segment. The ENB sends DCI0 to the UE to indicate the radio resource allocated to the UE. The UE retransmits the uplink signaling of the UE Capability Information according to the radio resource allocated by the ENB. The flow ends. Preferably, the bit size of BSR MAC CE does not exceed 4 bytes.

The embodiment of the present invention also provides an ENB, comprising a user plane entity and an uplink scheduler, wherein the user plane entity comprises:

a storing module, configured to, after a terminal initiates Radio Link Control (RLC) layer transmission of an uplink signaling or a service in an uplink acknowledged mode, store an identifier of the terminal and information of a RLC layer segment of the RLC layer transmission, wherein the information of the RLC layer segment comprises a size of the RLC layer segment;

a detecting module, configured to detect a scheduling request message sent by the terminal, wherein the scheduling request message is sent when the terminal determines that the ENB does not correctly receive the uplink signaling or the service initiated by the terminal, and the scheduling request message is configured to trigger RLC layer retransmission of the uplink signaling or the service; and a sending module, configured to, when the detecting module detects the scheduling request message configured to initiate retransmission, send the identifier of the terminal and the information of the size of the RLC layer segment stored by the storing module to the uplink scheduler; and the uplink scheduler is configured to perform uplink authorization to the terminal, determine radio resource to be allocated for the terminal and transmit information of the allocated radio resource to the terminal, according to the identifier of the terminal and the size of the RLC layer segment sent by the sending module.

Preferably, for the ENB, the information of the RLC layer segment of the transmission further comprises: the combining result of the segment; and the sending module is further configured to send the identifier of the terminal and the information of the size of the RLC layer segment of which the combining result is unsuccessful to the uplink scheduler of the ENB.

Preferably, for the ENB, the uplink scheduler comprises:

a radio resource determining module, configured to determine the radio resource to be allocated for the terminal to be greater or equal to the stored size of the RLC layer segment.

Preferably, for the ENB, the radio resource determining module is further configured to determine the radio resource to be allocated for the terminal to be equal to: the sum of the stored size of the RLC layer segment and the size of the BSR MAC CE.

The above is just the preferred embodiments of the present invention. It shall be noted that for those skilled in the technical field, there are some obvious improvements and modifications without deviation from the principle of the present invention. These improvements and modifications shall be regarded within the protection scope of the present invention.

What is claimed is:

1. A method for uplink transmission of Radio Link Control (RLC) layer, comprising:

step A, after a terminal initiates RLC layer transmission of an uplink signaling or a service in an uplink acknowledged mode, an Evolved Node B (ENB) storing an identifier of the terminal and information of a RLC layer segment of the RLC layer transmission, wherein the information of the RLC layer segment comprises a size of the RLC layer segment;

step B, the ENB detecting a scheduling request message sent by the terminal, wherein the scheduling request message is sent when the terminal determines that the ENB does not correctly receive the uplink signaling or the service initiated by the terminal, and the scheduling request message is configured to trigger RLC layer retransmission of the uplink signaling or the service; and step C, according to the stored size of the RLC layer segment, the ENB performing uplink authorization to the terminal, determining radio resource to be allocated for the terminal, and transmitting information of the allocated radio resource to the terminal.

2. The method according to claim 1, wherein the step A comprises:

step A1, a user plane entity of the ENB storing the identifier of the terminal and the information of the RLC layer segment of the transmission initiated by the terminal, and sending the identifier of the terminal and information of the size of the RLC layer segment to an uplink scheduler of the ENB; and in the step C, according to the stored size of the RLC layer segment, the uplink scheduler of the ENB performs the uplink authorization to the terminal, and determines the radio resource to be allocated for the terminal.

3. The method according to claim 2, wherein the information of the RLC layer segment of the transmission further comprises: a combining result of the segment; and the step A1 comprises:

the user plane entity of the ENB sending the identifier of the terminal and the information of the size of the RLC layer segment of which the combining result is unsuccessful to the uplink scheduler of the ENB.

4. The method according to claim 3, wherein in the step C, when performing the uplink authorization, the ENB determines the radio resource to be allocated for the terminal to be: greater or equal to the stored size of the RLC layer segment.

5. The method according to claim 3, wherein in the step C, when performing the uplink authorization, the ENB determines the radio resource to be allocated for the terminal to be equal to: a sum of the stored size of the RLC layer segment and a size of a BSR MAC control element.

6. The method according to claim 2, wherein in the step C, when performing the uplink authorization, the ENB determines the radio resource to be allocated for the terminal to be: greater or equal to the stored size of the RLC layer segment.

7. The method according to claim 2, wherein in the step C, when performing the uplink authorization, the ENB determines the radio resource to be allocated for the terminal to be equal to: a sum of the stored size of the RLC layer segment and a size of a BSR MAC control element.

8. The method according to claim 1, wherein in the step C, when performing the uplink authorization, the ENB determines the radio resource to be allocated for the terminal to be: greater or equal to the stored size of the RLC layer segment.

9. The method according to claim 1, wherein in the step C, when performing the uplink authorization, the ENB determines the radio resource to be allocated for the terminal to be equal to: a sum of the stored size of the RLC layer segment and a size of a Buffer State Report (BSR) Media Access Control (MAC) control element.

10. An Evolved Node B (ENB), comprising a user plane entity and an uplink scheduler, wherein the user plane entity comprises a first hardware processor, configured to:

after a terminal initiates Radio Link Control (RLC) layer transmission of an uplink signaling or a service in an uplink acknowledged mode, store an identifier of the terminal and information of a RLC layer segment of the RLC layer transmission, wherein the information of the RLC layer segment comprises a size of the RLC layer segment;

detect a scheduling request message sent by the terminal, wherein the scheduling request message is sent when the terminal determines that the ENB does not correctly receive the uplink signaling or the service initiated by the terminal, and the scheduling request message is configured to trigger RLC layer retransmission of the uplink signaling or the service; and when the first hardware processor detects the scheduling request message configured to initiate retransmission, send the identifier of the terminal and the information of the size of the RLC layer segment stored by the first hardware processor to the uplink scheduler; and the uplink scheduler comprises a second hardware processor, configured to perform uplink authorization to the terminal, determine radio resource to be allocated for the terminal and transmit information of the allocated radio resource to the terminal, according to the identifier of the terminal and the size of the RLC layer segment sent by the first hardware processor.

11. The ENB according to claim 10, wherein the information of the RLC layer segment of the transmission further comprises: a combining result of the segment; and the first hardware processor is further configured to send the identifier of the terminal and the information of the size of the RLC layer segment of which the combining result is unsuccessful to the uplink scheduler of the ENB.

12. The ENB according to claim 11, wherein the second hardware processor of the uplink scheduler is further configured to:
determine the radio resource to be allocated for the terminal to be greater or equal to the stored size of the RLC layer segment.

13. The ENB according to claim 11, wherein the second hardware processor is further configured to determine the radio resource to be allocated for the terminal to be equal to: a sum of the stored size of the RLC layer segment and a size of a BSR MAC control element.

14. The ENB according to claim 10, wherein the second hardware processor of the uplink scheduler is further configured to:
determine the radio resource to be allocated for the terminal to be greater or equal to the stored size of the RLC layer segment.

15. The ENB according to claim 10, wherein the second hardware processor is further configured to determine the radio resource to be allocated for the terminal to be equal to: a sum of the stored size of the RLC layer segment and a size of a Buffer State Report (BSR) Media Access Control (MAC) control element.

* * * * *